(12) United States Patent
Kashima et al.

(10) Patent No.: US 11,070,157 B2
(45) Date of Patent: Jul. 20, 2021

(54) MOTOR DRIVE UNIT, COMPRESSOR, AND AIR CONDITIONER

(71) Applicant: Mitsubishi Electric Corporation, Tokyo (JP)

(72) Inventors: Mitsuo Kashima, Tokyo (JP); Keiichiro Shizu, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/607,758

(22) PCT Filed: Jul. 21, 2017

(86) PCT No.: PCT/JP2017/026522
§ 371 (c)(1),
(2) Date: Oct. 24, 2019

(87) PCT Pub. No.: WO2019/016955
PCT Pub. Date: Jan. 24, 2019

(65) Prior Publication Data
US 2020/0321900 A1 Oct. 8, 2020

(51) Int. Cl.
*H02P 1/32* (2006.01)
*H02P 25/18* (2006.01)

(52) U.S. Cl.
CPC ............ *H02P 25/184* (2013.01); *H02P 1/32* (2013.01)

(58) Field of Classification Search
CPC .......... H02P 25/184; H02P 25/18; H02P 1/32; H02P 29/02
See application file for complete search history.

(56) References Cited

U.S. PATENT DOCUMENTS 4,609,858 A * 9/1986 Sugita .................. D03D 51/002
139/1 E
5,818,195 A * 10/1998 Frick ..................... H02P 25/184
318/771

(Continued)

FOREIGN PATENT DOCUMENTS

JP     S55-167595 U    12/1980
JP     2000-278992 A   10/2000

(Continued)

OTHER PUBLICATIONS

Extended European Search Report dated Mar. 26, 2020 issued in corresponding EP patent application No. 17918193.8.

(Continued)

*Primary Examiner* — Thai T Dinh
(74) *Attorney, Agent, or Firm* — Posz Law Group, PLC

(57) ABSTRACT

An electric motor drive unit includes a winding switching unit that switches a configuration of windings of an electric motor, a winding switching instruction unit that generates an instruction signal for the winding switching unit, and a winding configuration retention unit to which the instruction signal generated by the winding switching instruction unit is input, and if the input instruction signal has a first value, outputs a signal corresponding to the input instruction signal to the winding switching unit, and if the input instruction signal has a second value different from the first value, continues outputting a signal that has been output to the winding switching unit before the reception of the second value, the first value indicating an instruction on the configuration of the windings.

22 Claims, 9 Drawing Sheets

(56) References Cited

U.S. PATENT DOCUMENTS

| | | | | |
|---|---|---|---|---|
| 6,025,693 A * | 2/2000 | Smith | ................... | H02P 1/265 |
| | | | | 318/768 |
| 6,135,720 A * | 10/2000 | Boiler | ................... | F04C 28/08 |
| | | | | 318/771 |
| 6,362,592 B1 * | 3/2002 | Chrappan Soldavini | ................... | |
| | | | | H02P 6/085 |
| | | | | 318/768 |
| 8,598,836 B1 * | 12/2013 | Rabinovich | ............... | H02P 3/18 |
| | | | | 318/771 |
| 9,059,658 B2 * | 6/2015 | Bates | ................... | H02P 25/18 |
| 10,944,350 B2 * | 3/2021 | Shizu | ................... | H02P 25/18 |
| 2015/0168033 A1 * | 6/2015 | Yamakawa | ............. | F25B 30/02 |
| | | | | 62/324.6 |

FOREIGN PATENT DOCUMENTS

| | | | |
|---|---|---|---|
| JP | 2006-246674 A | | 9/2006 |
| JP | 2008-228513 A | | 9/2008 |
| JP | 2008228513 A | * | 9/2008 |
| JP | 2009-216324 A | | 9/2009 |
| JP | 2012-227980 A | | 11/2012 |
| WO | 95/35532 A1 | | 12/1995 |
| WO | WO-9535532 A1 | * | 12/1995 ............ H02J 3/1892 |

OTHER PUBLICATIONS

International Search Report of the International Searching Authority dated Oct. 24, 2017 for the corresponding International application No. PCT/JP2017/026522 (and English translation).

* cited by examiner

| S | R | Q | STATE OF RELAYS (7a, 7b, 7c) | STATE OF CONNECTION CONFIGURATION OF STATOR (3a) |
|---|---|---|---|---|
| H | H | HOLD | MAINTAIN PREVIOUS STATE | MAINTAIN PREVIOUS STATE |
| H | L | L | a-c CONDUCTIVE | STAR CONNECTION |
| L | H | H | b-c CONDUCTIVE | DELTA CONNECTION |
| L | L | (H) | (b-c CONDUCTIVE) | (DELTA CONNECTION) |

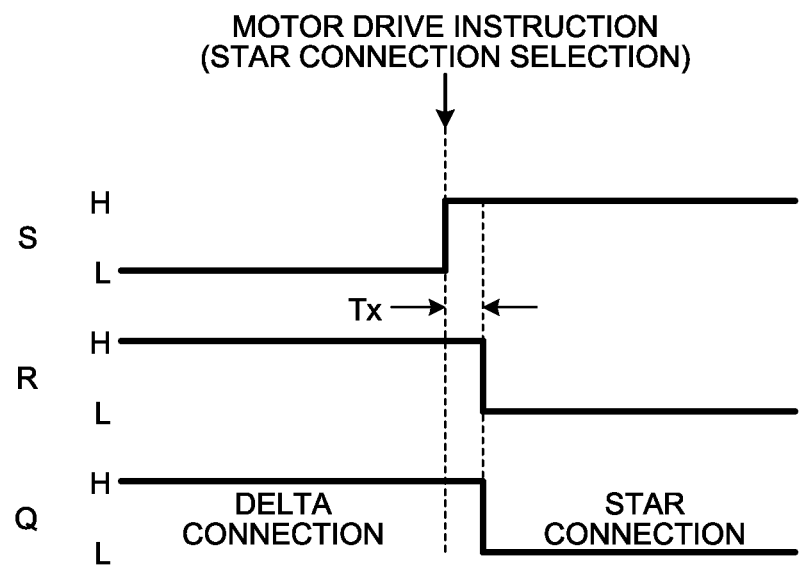
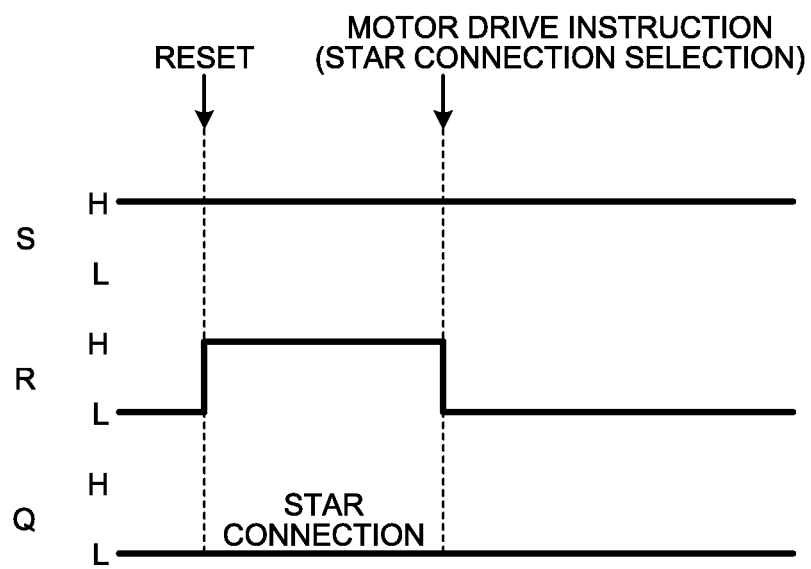

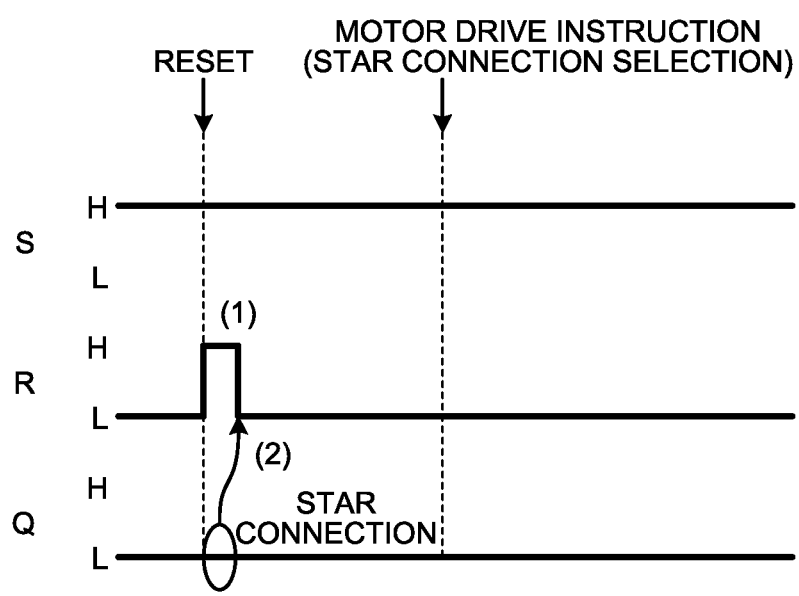

MOTOR DRIVE UNIT, COMPRESSOR, AND AIR CONDITIONER

CROSS REFERENCE TO RELATED APPLICATION

This application is a U.S. national stage application of International Patent Application No. PCT/JP2017/026522 filed on Jul. 21, 2017, the disclosure of which is incorporated herein by reference.

TECHNICAL FIELD

The present invention relates to an electric motor (hereinafter referred to simply as motor) drive unit that drives a motor that supports switching of the configuration of the windings, to a compressor, and to an air conditioner.

BACKGROUND

A motor drive unit that enables an air conditioner to have improved energy consumption efficiency is proposed in Patent Literature 1. The motor drive unit is a conventional motor drive unit that drives a motor that supports switching of the configuration of the windings. The motor drive unit described in Patent Literature 1 selects a suitable winding connection configuration in each of a low rotational frequency range and a high rotational frequency range, and thus achieves improved energy consumption efficiency.

PATENT LITERATURE

Patent Literature 1: Japanese Patent Application Laid-open No. 2009-216324

Some of conventional motor drive units that drive a motor that supports switching of the winding configuration are configured to use an arithmetic processing unit, such as a microcomputer, to generate an instruction to switch the winding configuration. A conventional motor drive unit that allows a microcomputer to generate an instruction to switch the winding configuration does not take into consideration occurrence of an unexpected reset, such as a terminal reset due to lightning-induced noise, or a watchdog timer reset caused by software runaway. Therefore, occurrence of a reset during operation of the motor may cause switching of the winding configuration. In general, occurrence of a reset in an arithmetic processing unit such as a microcomputer causes all the input-output ports to act as an input port, in which case the input-output ports of the arithmetic processing unit each transition to a high impedance state. Switching of the winding configuration during operation of the motor induces a surge voltage, which may cause an excessive voltage to be applied to the circuit that switches the winding connection configuration or the like to lead to a failure. In a case in which the motor is a permanent magnet motor, occurrence of a reset during a high speed rotation of the motor causes the winding configuration suitable for operation in a high rotational frequency range to change to the winding configuration suitable for operation in a low rotational frequency range. As a result, the permanent magnet motor induces an excessive counterelectromotive force, which may cause a voltage higher than the withstand voltage of a component included in the motor drive unit to be applied, and may thus cause the motor drive unit to fail. As described above, a conventional motor drive unit presents a problem in that occurrence of an unexpected reset may cause a failure of the motor drive unit.

SUMMARY

The present invention has been made in view of the foregoing, and it is an object of the present invention to provide a motor drive unit having improved reliability.

A motor drive unit according to an aspect of the present invention includes a winding switching unit to switch a configuration of windings of a motor, and a winding switching instruction unit to generate an instruction signal for the winding switching unit. The motor drive unit further includes a winding configuration retention unit to which the instruction signal generated by the winding switching instruction unit is input, and in a case in which the input instruction signal has a first value, to output a signal corresponding to the input instruction signal to the winding switching unit, and in a case in which the input instruction signal has a second value different from the first value, to continue outputting a signal that has been output to the winding switching unit before the reception of the second value, the first value indicating an instruction on the configuration of the windings.

The present invention provides an effect in that a motor drive unit having improved reliability can be provided.

BRIEF DESCRIPTION OF DRAWINGS

FIG. 9 is a diagram illustrating the relationships among the input signals to the winding configuration retention unit and the output signal of the winding configuration retention unit in the case of switching of the stator from the delta connection to the star connection.

FIG. 10 is a diagram illustrating the relationships among the input signals to the winding configuration retention unit and the output signal of the winding configuration retention unit upon occurrence of a reset when the windings are in the star connection.

FIG. 12 is a diagram illustrating the relationships among the input signals to the winding configuration retention unit and the output signal of the winding configuration retention unit upon occurrence of a reset when the windings are in the star connection.

DETAILED DESCRIPTION

A motor drive unit, a compressor, and an air conditioner according to embodiments of the present invention will be described in detail below with reference to the drawings. Note that these embodiments are not intended to limit the scope of this invention. The following embodiments will be described, by way of example, in terms of a motor drive unit that drives a motor included in a compressor in a split-type air conditioner.

First Embodiment

Figure 1:
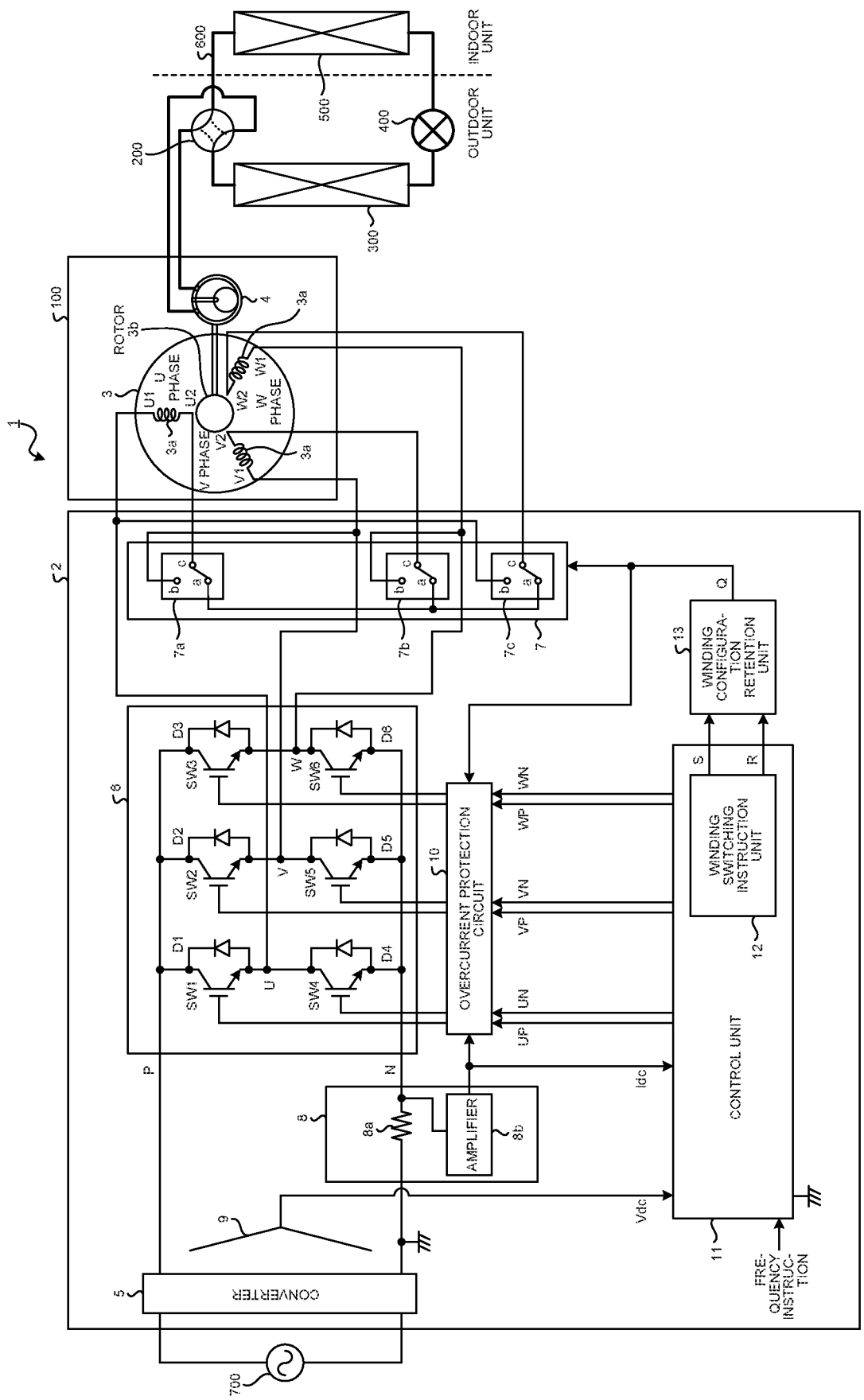
FIG. 1 is a diagram illustrating an example configuration of an air conditioner according to a first embodiment.

FIG. 1 is a diagram illustrating an example configuration of an air conditioner according to a first embodiment of the present invention. An air conditioner 1 according to the first embodiment includes a motor drive unit 2, a compressor 100, a four-way valve 200, an outdoor heat exchanger 300, an expansion valve 400, and an indoor heat exchanger 500. Out of the components of the air conditioner 1, the indoor heat exchanger 500 is housed in an indoor unit not illustrated, and the other components are housed in an outdoor unit not illustrated.

The compressor 100 includes a motor 3 and a compression unit 4. The motor 3 is a permanent magnet motor configured to allow switching of the configuration of the windings. The motor 3 includes a stator 3a including windings of U-phase, V-phase, and W-phase, and a permanent magnet rotor 3b. The following description will refer to the permanent magnet rotor 3b as "rotor 3b". The winding of each of U-phase, V-phase, and W-phase of the motor 3 can be switched to form either connection configuration of a star connection and a delta connection. As used herein, the windings of U-phase, V-phase, and W-phase may also be referred to respectively as U-phase winding, V-phase winding, and W-phase winding, as needed. The connection configuration of each of the windings is controlled by the motor drive unit 2. The compression unit 4 is driven by the motor 3 to compress a refrigerant that circulates through a refrigerant circuit described later herein.

The compressor 100, the four-way valve 200, the outdoor heat exchanger 300, the expansion valve 400, and the indoor heat exchanger 500 are connected to one another via a refrigerant pipe 600 to form a refrigerant circuit. The refrigerant circuit uses endothermic or exothermic process of air or the like involved in heat exchange during evaporation or condensation of the refrigerant to change the pressure of the refrigerant circulating through the refrigerant circuit, thus to perform air conditioning or the like. The outdoor heat exchanger 300 exchanges heat between the refrigerant and air by using airflow from a blower fan (not illustrated). Similarly, the indoor heat exchanger 500 also exchanges heat between the refrigerant and air under operation of a blower fan (not illustrated).

The motor drive unit 2 is connected with an alternating current (AC) power supply 700. The motor drive unit 2 is supplied with AC power from the AC power supply 700 to drive the motor 3.

The motor drive unit 2 includes a converter 5, an inverter 6, a winding switching unit 7, a current detector 8, a voltage detector 9, an overcurrent protection circuit 10, a control unit 11, and a winding configuration retention unit 13.

The converter 5 converts the AC power supplied from the AC power supply 700 into direct current (DC) power. There is no particular limitation on the configuration of the converter 5 in the present embodiment. Although being illustrated as a single-phase one in FIG. 1, the AC power supply 700 may be a three-phase one.

The inverter 6 converts the DC power output by the converter 5 into three-phase AC power, and supplies the three-phase AC power to the motor 3. The inverter 6 includes switching devices SW1 to SW6, diodes D1 to D6 respectively coupled in antiparallel with the switching devices SW1 to SW6, and a drive circuit (not illustrated) for driving the switching devices SW1 to SW6. Note that each of the switching devices SW1 to SW6 in the example configuration in FIG. 1 is an insulated gate bipolar transistor (IGBT), but are not limited to this configuration. For example, each of the switching devices SW1 to SW6 may be formed by a metal oxide semiconductor field effect transistor (MOSFET) using silicon carbide (SiC). In this case, the body diodes of the MOSFETs may be used to omit the diodes D1 to D6.

The winding switching unit 7 switches the configuration of the windings of U-phase, V-phase, and W-phase of the stator 3a to either a star connection or a delta connection. The winding switching unit 7 includes relays 7a, 7b, and 7c, each of which is a transfer-contact mechanical relay, and a drive circuit (not illustrated) for the relays 7a, 7b, and 7c. Here, one end of the U-phase winding is denoted as U1 and the other end of the U-phase winding is denoted as U2. Similarly, one end of the V-phase winding is denoted as V1 and the other end of V-phase winding is denoted as V2, and one end of the W-phase winding is denoted as W1 and the other end of the W-phase winding is denoted as W2. The U1-side end of the U-phase winding is coupled to a connection point U between the switching devices SW1 and SW4 of the inverter 6, and to a terminal b of the relay 7c. Similarly, the V1-side end of the V-phase winding is coupled to a connection point V between the switching devices SW2 and SW5, and to a terminal b of the relay 7a, and the W1-side end of the W-phase winding is coupled to a connection point W between the switching devices SW3 and SW6, and to a terminal b of the relay 7b. Meanwhile, the U2-side end of the U-phase winding is coupled to a terminal c of the relay 7a, the V2-side end of the V-phase winding is coupled to a terminal c of the relay 7b, and the W2-side end of the W-phase winding is coupled to a terminal c of the relay 7c. In addition, the winding switching unit 7 is configured such that terminals a of the relays 7a, 7b, and 7c are coupled to one another. As described later in more detail, the relays 7a, 7b, and 7c have a same configuration and perform a same operation.

Note that FIG. 1 illustrates an example in which the relays 7a, 7b, and 7c of the winding switching unit 7 are each configured using a transfer-contact mechanical relay, but are not limited to this configuration. For example, instead of using a transfer-contact mechanical relay, a combination of a normally open mechanical relay and a normally closed mechanical relay may be used to form each of the relays 7a, 7b, and 7c. Alternatively, the relays 7a, 7b, and 7c may each be configured, without using a mechanical relay, using a bidirectional semiconductor switch such as a triac, or using a combination of a diode bridge and a unidirectional semiconductor switch.

The current detector 8 includes a shunt resistor 8a and an amplifier 8b to detect a DC current of a DC bus line supplied from the converter 5 to the inverter 6. Note that although FIG. 1 illustrates the current detector 8 as being configured to use the shunt resistor 8a, the current detector 8 may be configured to use an element such as a highly-responsive current sensor using a Hall sensor.

The voltage detector 9 detects a DC voltage across the DC bus lines which is an output of the converter 5.

The overcurrent protection circuit 10 is a circuit for preventing an excessive current greater than a predetermined capacity from flowing in the motor drive unit 2. The overcurrent protection circuit 10 determines the existence or non-existence of anomaly of the motor drive unit 2 based on the detected value of the current detector 8, and when no anomaly is detected, outputs a signal input from the control unit 11, which will be described later, to the inverter 6. Otherwise, when an anomaly is detected, the overcurrent protection circuit 10 outputs, to the inverter 6, a signal for forcibly turning off and maintaining the switching devices SW1 to SW6 of the inverter 6 at an Off state instead of the signal input from the control unit 11, thus to prevent an excessive current from flowing in the motor drive unit 2. The predetermined capacity to be set is either the current-carrying capacity that can avoid failure of the motor drive unit 2, or the current-carrying capacity that can avoid demagnetization of the permanent magnet rotor 3b of the motor 3, whichever is lower. The present embodiment describes the case in which the current-carrying capacity that can avoid demagnetization is lower.

The control unit 11 generates pulse width modulation (PWM) signals (as indicated by UP, UN, VP, VN, WP, and WN in the figure) for driving the switching devices SW1 to SW6 of the inverter 6 based on a frequency instruction input from the outside, on the detected value of the current detector 8, and on the detected value of the voltage detector 9, and then outputs these PWM signals to the overcurrent protection circuit 10. In addition, the control unit 11 includes a winding switching instruction unit 12 that generates a winding switching instruction, which is an instruction signal for the winding switching unit 7. The control unit 11 can be implemented by, for example, an arithmetic processing unit, such as a digital signal processor (DSP) or a microcomputer, including elements such as a read-only memory (ROM), a random access memory (RAM), and/or an analog-digital (AD) converter.

The winding configuration retention unit 13 outputs, to the winding switching unit 7, a signal for maintaining the winding configuration corresponding to the winding switching instruction output by the winding switching instruction unit 12 of the control unit 11.

Figure 2:
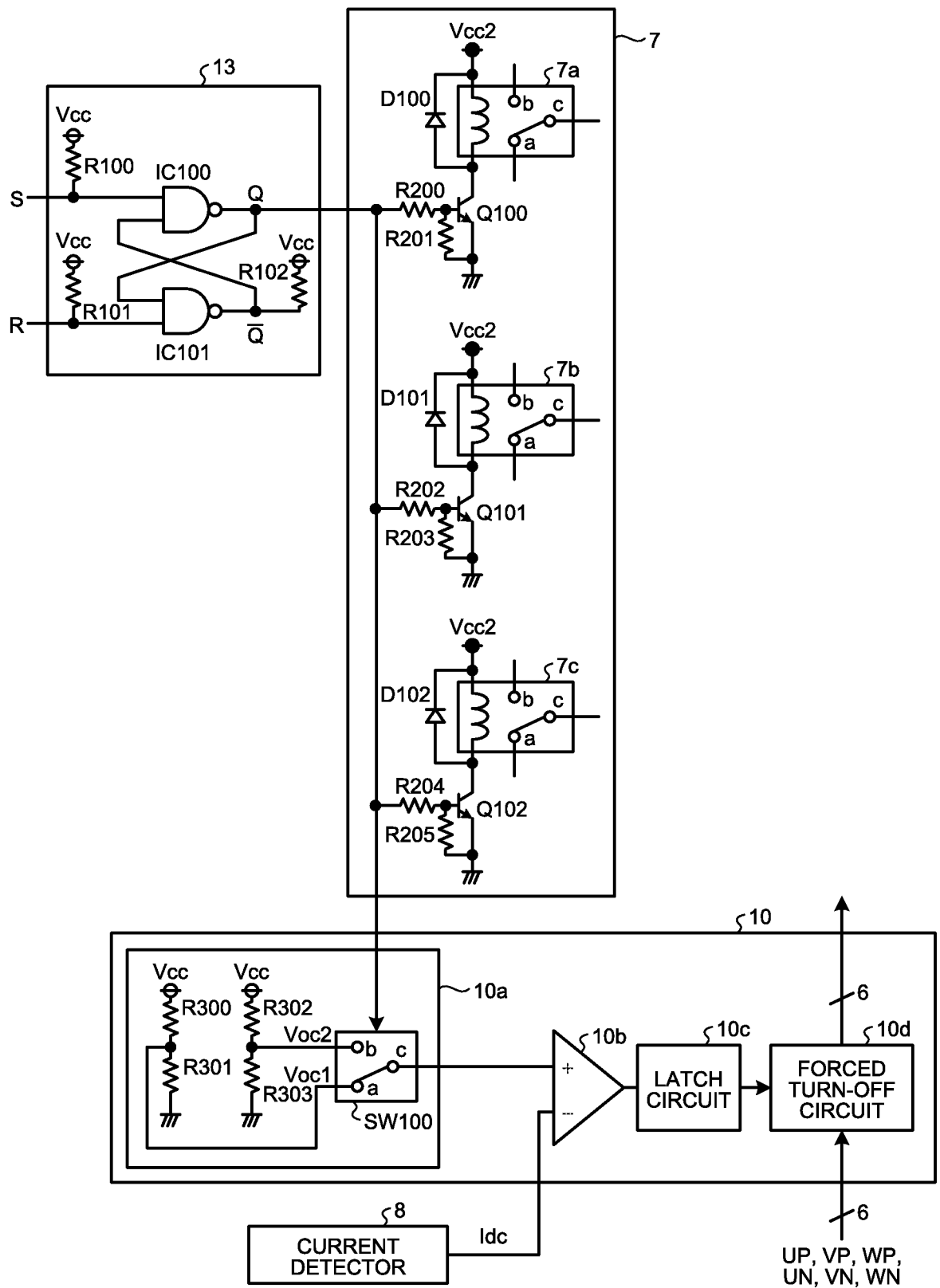
FIG. 2 is a diagram illustrating an example of detailed configuration of a winding switching unit, an overcurrent protection circuit, a winding configuration retention unit according to the first embodiment.

A detailed example configuration of the winding switching unit 7, the overcurrent protection circuit 10, and the winding configuration retention unit 13 will next be described with reference to FIG. 2. FIG. 2 is a diagram illustrating an example of detailed configuration of the winding switching unit 7, the overcurrent protection circuit 10, and the winding configuration retention unit 13.

The winding configuration retention unit 13 includes a reset-set flip-flop (hereinafter referred to as "RS flip-flop") having active Low inputs using two NAND gates (IC100, IC101). To the winding configuration retention unit 13, winding switching instructions generated by the winding switching instruction unit 12 are input as signals S and R. The terminal for inputting the signal S is coupled with a pull-up resistor R100, and the terminal for inputting the signal R is coupled with a pull-up resistor R101. The pull-up resistors R100 and R101 are provided to manage the situation in which occurrence of a reset in the arithmetic processing unit that implements the control unit 11 including the winding switching instruction unit 12 causes the input-output ports to transition to a high impedance state, thereby causing the winding switching instruction unit 12 to be switched from a coupled state with the winding configuration retention unit 13 to a decoupled state from the winding configuration retention unit 13, that is, causing the state in which the output signal of the winding switching instruction unit 12 is input to the winding configuration retention unit 13 to be switched to the state in which the output signal of the winding switching instruction unit 12 is no longer input to the winding configuration retention unit 13. This enables the winding configuration retention unit 13 to output a signal indicating a same state as the state immediately before the occurrence of a reset to the winding switching unit 7 even when a reset has occurred in the arithmetic processing unit that implements the control unit 11 including the winding switching instruction unit 12. That is, even when a reset occurs in the arithmetic processing unit that implements the control unit 11 including the winding switching instruction unit 12, the signal input to the winding switching unit 7 remains in a same state, thereby causing no switching of the winding connection configuration of the motor 3 to occur. Meanwhile, a signal Q, which is one of the output signals of the RS flip-flop is input to the winding switching unit 7. The output terminal for a signal Q-bar, which is the other output signal, is coupled with a pull-up resistor R102. Note that the output (Q) of the winding configuration retention unit 13 at a Low level (hereinafter indicated by "L") represents a star connection instruction, while the output (Q) of the winding configuration retention unit 13 at a High level (hereinafter indicated by "H") represents a delta connection instruction.

The winding switching unit 7 includes, in addition to the relays 7a to 7c described above, transistors Q100 to Q102, diodes D100 to D102, and resistors R200 to R205. In this winding switching unit 7, the output (Q) of the winding configuration retention unit 13 at "L" drives the transistors Q100, Q101, and Q102 to an OFF state, and thus causes each of the relays 7a, 7b, and 7c to conduct between the terminal a and the terminal c. In addition, in the winding switching unit 7, the output (Q) of the winding configuration retention unit 13 at "H" drives the transistors Q100, Q101, and Q102 to an ON state, and thus causes each of the relays 7a, 7b, and 7c to conduct between the terminal b and the terminal c.

The overcurrent protection circuit 10 includes an overcurrent protection level switching unit 10a, a comparator 10b, a latch circuit 10c, and a forced turn-off circuit 10d.

The overcurrent protection level switching unit 10a includes a switch SW100 and resistors R300 to R303. The resistors R300 and R301 together form a voltage divider circuit to divide a supply voltage Vcc to generate a first overcurrent protection level Voc1. The resistors R302 and R303 together form a voltage divider circuit to divide the supply voltage Vcc to generate a second overcurrent protection level Voc2. The first overcurrent protection level Voc1 and the second overcurrent protection level Voc2 are input to the switch SW100. The switch S100 is configured to select and output the first overcurrent protection level Voc1 in the case of the output (Q) of the winding configuration retention unit 13 being at "L", and to select and output the second overcurrent protection level Voc2 in the case of the output (Q) of the winding configuration retention unit 13 being at "H". It is assumed herein that the first overcurrent protection level Voc1 is a voltage at a level that can avoid demagnetization of the rotor 3b when the motor 3 is in a star connection, and that the second overcurrent protection level Voc2 is a voltage at a level that can avoid demagnetization of the rotor 3b when the motor 3 is in a delta connection. The voltage levels Voc1 and Voc2 are determined to meet the relationship of "Voc1<Voc2".

To the comparator 10b, the signal (Voc1 or Voc2) output from the overcurrent protection level switching unit 10a and the signal (Idc) output from the current detector 8 described above are input. The comparator 10b compares the two input signals, and outputs an "L" signal in a case in which the signal Idc has a level greater than the level of the output signal from the overcurrent protection level switching unit 10a, i.e., the overcurrent protection level (Voc1 or Voc2). The latch circuit 10c holds its output at "L" after the output of the comparator 10b transitions to "L". To the forced turn-off circuit 10d, the signal output from the latch circuit 10c and the PWM signals (UP, VP, WP, UN, VN, WN) output from the control unit 11 are input. In a case in which the output signal from the latch circuit 10c is at "H", the forced turn-off circuit 10d outputs the PWM signals input from the control unit 11 without change. When the output signal from the latch circuit 10c transitions to "L", the forced turn-off circuit 10d generates and outputs signals to turn off each of the switching devices (SW1, SW2, SW3, SW4, SW5, SW6) of the inverter 6, instead of the PWM signals input from the control unit 11.

As described above, when the input signal from the current detector 8 exceeds the overcurrent protection level, the overcurrent protection circuit 10 is actuated and stops the power supply from the inverter 6 to the motor 3. In addition, the overcurrent protection circuit 10 switches the overcurrent protection level depending on the winding connection configuration of the motor 3.

Figure 3:
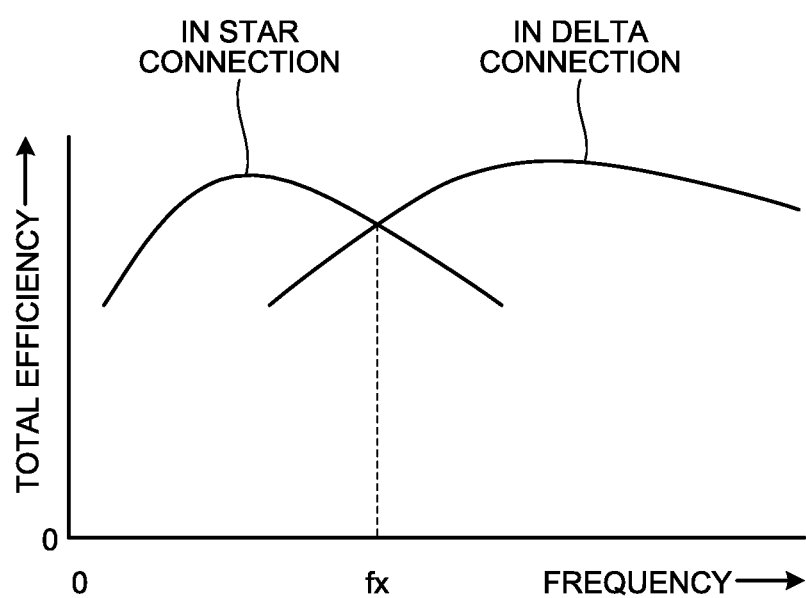
FIG. 3 is a diagram illustrating an example of relationship between an operational frequency and an efficiency of the air conditioner according to the first embodiment.

An operation of the motor drive unit 2 will next be described. FIG. 3 is a diagram illustrating an example of relationship between an operational frequency and an efficiency of the air conditioner 1. FIG. 3 illustrates a relationship between the frequency and the total efficiency in each of the cases of a star connection and a delta connection of the stator 3a of the motor 3. The frequency illustrated in FIG. 3 denotes the operational frequency of the motor 3, and the total efficiency represents an efficiency calculated by multiplying together the efficiency of the motor drive unit 2 and the efficiency of the motor 3. The relationship between the frequency and the total efficiency illustrated in FIG. 3 indicates that high power operation and highly energy-saving operation can be both achieved by selecting a delta connection when high speed operation is demanded, and selecting a star connection when low speed operation is demanded. Accordingly, the air conditioner 1 selects a delta connection when high speed operation is demanded, and selects a star connection when low speed operation is demanded. Specifically, the air conditioner 1 selects the delta connection for an operational frequency greater than or equal to the frequency fx illustrated in FIG. 3, and selects the star connection for an operational frequency less than the frequency fx.

Figure 4:
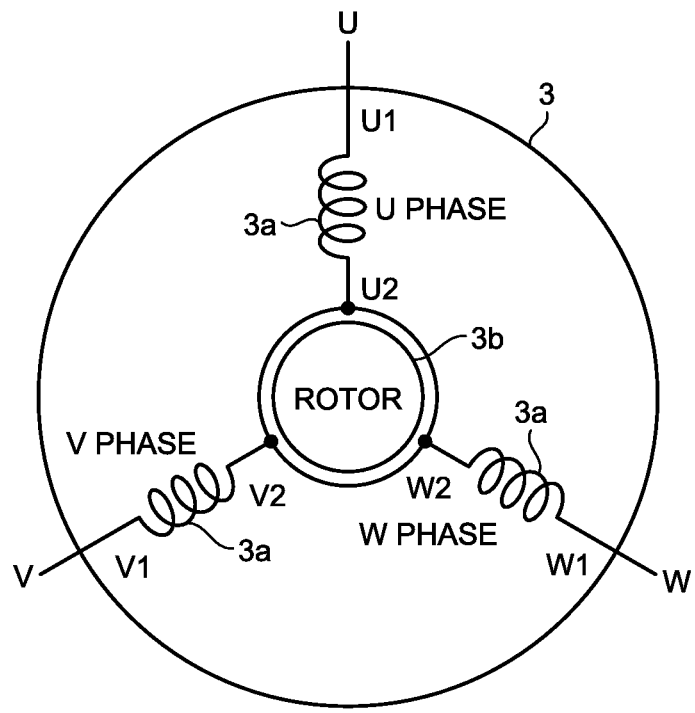
FIG. 4 is a diagram illustrating the configuration of the windings of the motor in the case of selection of a star connection.
Figure 5:
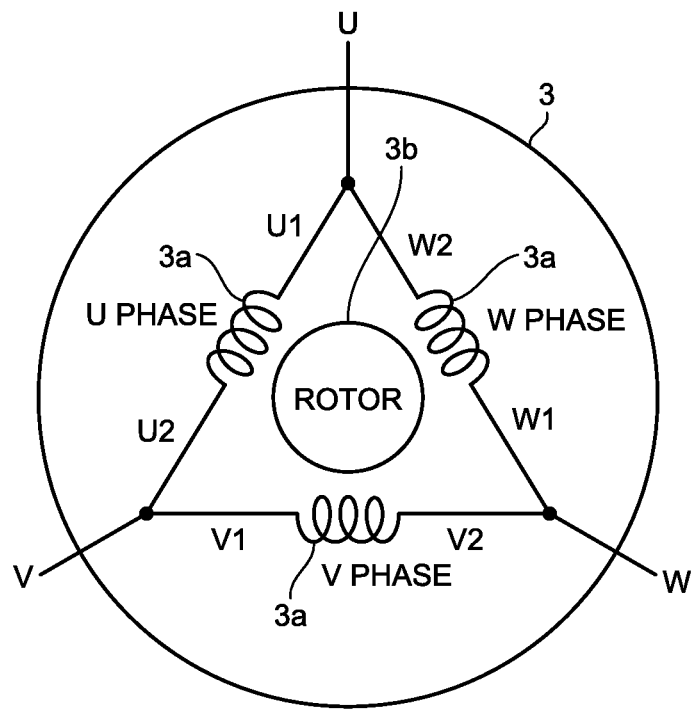
FIG. 5 is a diagram illustrating the configuration of the windings of the motor in the case of selection of a delta connection.

The windings of the stator 3a are switched to be arranged in a star connection or in a delta connection by the winding switching unit 7. An output (Q) of the winding configuration retention unit 13 indicating a star connection instruction causes each of the relays 7a, 7b, and 7c to conduct between the terminal a and the terminal c. This causes the U2-side end of the U-phase winding, the V2-side end of the V-phase winding, and the W2-side end of the W-phase winding of the stator 3a to be coupled to one another, thereby driving the motor 3 into the winding configuration illustrated in FIG. 4, i.e., into the configuration of star connection. Alternatively, an output (Q) of the winding configuration retention unit 13 indicating a delta connection instruction causes each of the relays 7a, 7b, and 7c to conduct between the terminal b and the terminal c. As a result, the U2-side end of the U-phase winding and the V1-side end of the V-phase winding, the V2-side end of the V-phase winding and the W1-side end of the W-phase winding, and the W2-side end of the W-phase winding and U1-side end of the U-phase winding of the stator 3a are each coupled to each other, thereby driving the motor 3 into the winding configuration illustrated in FIG. 5, i.e., into the configuration of delta connection. Note that for purposes of clear illustration of the winding connection configuration, FIGS. 4 and 5 omit illustration of the winding switching unit 7.

Figure 6:
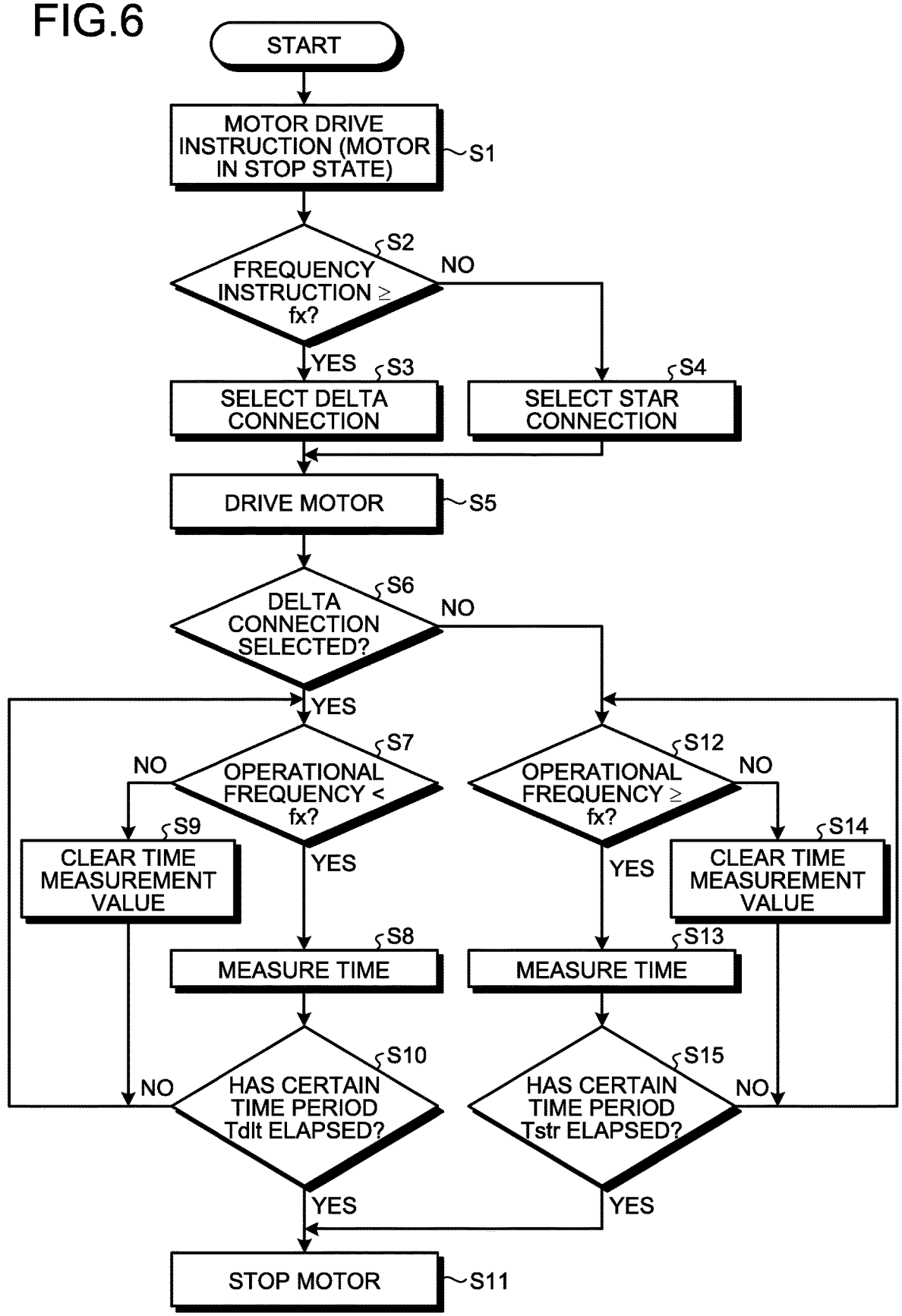
FIG. 6 is a flowchart illustrating an example operation of switching of the winding connection configuration of the motor performed by the motor drive unit according to the first embodiment.

Next, an operation of switching of the winding connection configuration of the motor 3 by the motor drive unit 2 will be described with reference to FIG. 6. FIG. 6 is a flowchart illustrating an example operation of switching of the winding connection configuration of the motor 3 performed by the motor drive unit 2.

In the motor drive unit 2, the control unit 11 receives a motor drive instruction while the motor 3 is in a stop state (step S1). The motor drive instruction is herein a frequency instruction having a value greater than zero. Note that a frequency instruction having a value greater than a predetermined positive number may also be used as the motor drive instruction. Upon reception of the motor drive instruction, the control unit 11 predicts whether the frequency indicated by the frequency instruction (hereinafter referred to simply as "frequency instruction") input from the outside will reach or exceed the frequency fx illustrated in FIG. 3, that is, reach or exceed the frequency fx, at which the total efficiency curve for the star connection and the total efficiency curve for the delta connection intersect (step S2). For example, the control unit 11 predicts whether the frequency instruction will reach or exceed the frequency fx based on a set temperature of the air conditioner 1 and the room temperature. In this case, for example, the control unit 11 predicts that the frequency instruction will reach or exceed the frequency fx in a case in which the difference between the set temperature and the room temperature is greater than or equal to a predetermined threshold, and predicts that the frequency instruction will not reach or exceed the frequency fx in a case in which the difference between the set temperature and the room temperature is less than the threshold. The threshold to be used may differ for heating operation and cooling operation. The control unit 11 may predict whether the frequency instruction will reach or exceed the frequency fx based on a frequency instruction input before stoppage of the motor 3. In this case, for example, the control unit 11 predicts that the frequency instruction will reach or exceed the frequency fx in a case in which the frequency instruction input before stoppage of the motor 3 is in an increasing trend, and the difference between the frequency fx and the last-received frequency instruction is less than or equal to a predetermined threshold. Otherwise, in a case in which the frequency instruction input before stoppage of the motor 3 is in a decreasing trend, and the difference between the last-input frequency instruction and the frequency fx is less than or equal to the predetermined threshold, the control unit 11 predicts that frequency instruction will not reach or exceed the frequency fx. Whether or not the frequency instruction will reach or exceed the frequency fx may be predicted using another method.

When it is predicted that the frequency instruction will reach or exceed the frequency fx (step S2: Yes), the control unit 11 selects the delta connection, and the winding switching instruction unit 12 outputs a delta connection instruction (step S3). When it is predicted that the frequency instruction will not reach or exceed the frequency fx, and will range below the frequency fx (step S2: No), the control unit 11 selects the star connection, and the winding switching instruction unit 12 outputs a star connection instruction (step S4). After completion of selection of the winding connection configuration of the motor 3, the control unit 11 starts to generate and output PWM signals to drive the motor 3 (step S5).

When the delta connection has been selected (step S6: Yes), the control unit 11 determines whether the operational frequency of the motor 3 is less than the frequency fx (step S7). At this step S7, the control unit 11 obtains information on the operational frequency of the motor 3 by prediction based on the frequency instruction input from the outside, the detected value of the current detector 8, and the detected value of the voltage detector 9. The control unit 11 may use the frequency indicated by the frequency instruction instead of the operational frequency of the motor 3 obtained from the compressor 100. That is, the control unit 11 may operate by using the frequency indicated by the frequency instruction as the operational frequency of the motor 3. The control unit 11 may otherwise obtain the operational frequency of the motor 3 based on the frequency instruction. When the operational frequency is less than the frequency fx (step S7: Yes), the control unit 11 measures a time elapsed since the operational frequency falls below the frequency fx (step S8), and determines whether the elapsed time since the operational frequency falls below the frequency fx has exceeded a certain predetermined time period Tdlt (e.g., 10 minutes), i.e., whether the certain time period Tdlt has elapsed since the start of the measurement (step S10). When the certain time period Tdlt has elapsed since the start of the measurement (step S10: Yes), the control unit 11 stops the motor 3 (step S11). Then, after a certain time period (e.g., 3 minutes) has elapsed to allow the motor 3 to completely stop, the control unit 11 returns the process to step S1, and drives again the motor 3 (not illustrated).

Otherwise, when the operational frequency is greater than or equal to the frequency fx (step S7: No), the control unit 11 clears the measurement value of the time elapsed since the operational frequency falls below the frequency fx (step S9), and then returns the process to step S7 to continue the process. Meanwhile, when the elapsed time since the operational frequency falls below the frequency fx has not yet reached the certain time period Tdlt (step S10: No), the control unit 11 returns the process to step S7 to continue the process. Note that the process from step S7 to S10 corresponds to the operation of determining whether a need exists to perform switching from the delta connection currently selected to the star connection.

When the delta connection has not been selected, that is, when the star connection has been selected (step S6: No), the control unit 11 determines whether the operational frequency of the motor 3 is greater than or equal to the frequency fx (step S12). When the operational frequency is greater than or equal to the frequency fx (step S12: Yes), the control unit 11 measures a time elapsed since the operational frequency reaches or exceeds the frequency fx (step S13), and determines whether the elapsed time since the operational frequency reaches or exceeds the frequency fx has exceeded a certain predetermined time period Tstr (e.g., 10 minutes), i.e., whether the certain time period Tstr has elapsed since the start of the measurement (step S15). When the certain time period Tstr has elapsed since the start of the measurement (step S15: Yes), the control unit 11 stops the motor 3 (step S11). Then, after a certain time period (e.g., 3 minutes) has elapsed to allow the motor 3 to completely stop, the control unit 11 returns the process to step S1, and drives again the motor 3 (not illustrated).

Otherwise, When the operational frequency is less than the frequency fx (step S12: No), the control unit 11 clears the measurement value of the time elapsed since the operational frequency reaches or exceeds the frequency fx (step S14), and then returns the process to step S12 to continue the process. Meanwhile, if the above measured time has not yet reached the certain time period Tstr (step S15: No), the control unit 11 returns the process to step S12 to continue the process. Note that the process from step S12 to S15 corresponds to the operation of determining whether a need exists to perform switching from the star connection currently selected to the delta connection.

Figures 7, 8:
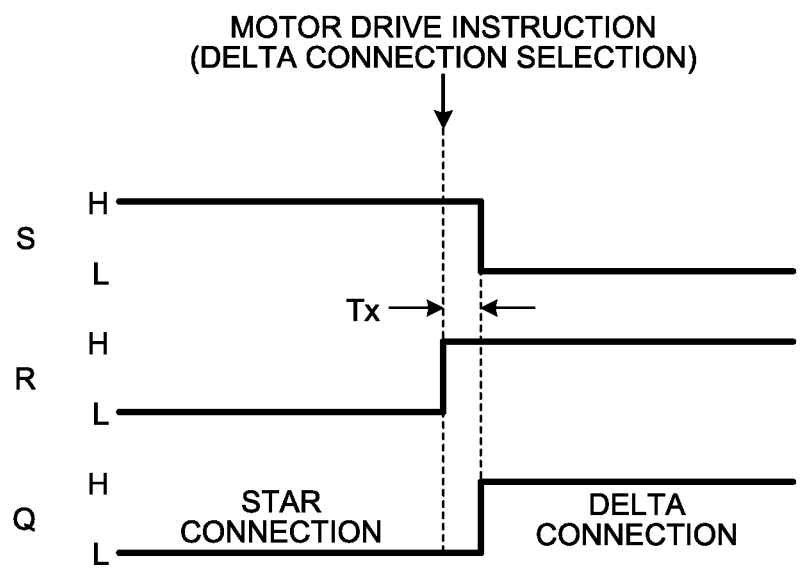
FIG. 7 is a diagram illustrating relationships among the states of input signals S and R to the winding configuration retention unit, the state of an output signal Q of the winding configuration retention unit, the state of each of the relays, and the connection configuration of the stator.
FIG. 8 is a diagram illustrating the relationships among the input signals to the winding configuration retention unit and the output signal of the winding configuration retention unit in the case of switching of the stator from a star connection to a delta connection.

An operation of the motor drive unit 2 will be described below using, as an example, the case in which the winding configuration retention unit 13 and the winding switching unit 7 are configured as illustrated in FIG. 2. FIG. 7 is a diagram illustrating relationships among the states of the input signals S and R to the winding configuration retention unit 13, the state of the output signal Q of the winding configuration retention unit 13, the state of each of the relays 7a, 7b, and 7c, and the connection configuration of the stator 3a.

When the combination of the input signals S and R to the winding configuration retention unit 13 is "S=H and R=H", the output signal (Q) of the winding configuration retention unit 13 remains in a previous output state. When a reset occurs in the arithmetic processing unit that implements the control unit 11 including the winding switching instruction unit 12, this combination will become "S=H and R=H". When the combination of the input signals S and R to the winding configuration retention unit 13 is "S=H and R=L", the output signal (Q) of the winding configuration retention unit 13 is driven to "Q=L". This renders the state of each of the relays (7a, 7b, 7c) "a-c conductive", in which the path between the terminal a and the terminal c is conductive, thereby causing the connection configuration of the stator 3a to become "star connection". Otherwise, when the combination of the input signals S and R to the winding configuration retention unit 13 is "S=L and R=H", the output signal (Q) of the winding configuration retention unit 13 is driven to "Q=H". This renders the state of each of the relays (7a, 7b, 7c) "b-c conductive", in which the path between the terminal b and the terminal c is conductive, thereby causing the connection configuration of the stator 3a to become "delta connection". In addition, when the combination of the input signals S and R to the winding configuration retention unit 13 is "S=L and R=L", the output signal (Q) of the winding configuration retention unit 13 is driven to "Q=H", while the companion output signal (Q-bar) thereof is also driven to "H". When this state changes to "S=H and R=H", the output signal (Q) will become unstable. Therefore, the setting of "S=L and R=L" is forbidden. That is, the winding switching instruction unit 12 does not output a winding switching instruction of "S=L and R=L". Note that, in terms of the winding configuration retention unit 13, "Q=L" corresponds to a star connection instruction and "Q=H" corresponds to a delta connection instruction. In addition, in terms of the winding switching instruction unit 12, "S=H and R=L" corresponds to a star connection instruction, and "S=L and R=H" corresponds to a delta connection instruction. The combinations "S=H and R=L" and "S=L and R=H" each correspond to a first value that provides an instruction on the configuration of the windings, and the combination "S=H and R=H" corresponds to a second value that provides an instruction to maintain the configuration of the windings before the occurrence of a reset.

An operation of the winding switching instruction unit 12 will next be described. FIG. 8 is a diagram illustrating the relationships among the input signals to the winding configuration retention unit 13 and the output signal of the winding configuration retention unit 13 in the case of switching of the stator 3a from the star connection to the delta connection upon reception of a motor drive instruction. FIG. 9 is a diagram illustrating the relationships among the input signals to the winding configuration retention unit 13 and the output signal of the winding configuration retention unit 13 in the case of switching of the stator 3a from the delta connection to the star connection. As illustrated in FIGS. 8 and 9, to prevent the input signals S and R to the winding configuration retention unit 13 from concurrently being at "L", the motor drive unit 2 provides a certain time period of section during which the output signals S and R are concurrently at "H" immediately before switching of the winding switching instruction. The section during which the output signals S and R are concurrently at "H" has a length Tx of about 1 ms. Thus, the winding switching instruction unit 12 continues outputting the star connection instruction (S=H, R=L) or the delta connection instruction (S=L, R=H) rather than outputting a hold-state instruction (S=H, R=H) except immediately before switching of the winding switching instruction, and except after reset removal as described later. This can prevent occurrence of unexpected switching of winding configuration upon superimposition of noise in the output signals S and R of the winding switching instruction unit 12.

Note that, in a case in which the control unit 11 is implemented using an arithmetic processing unit such as a microcomputer, occurrence of a reset such as a terminal reset due to lightning-induced noise or a watchdog timer reset caused by runaway of a program, generally causes all the input-output ports of the arithmetic processing unit to act as an input port. This causes a state where the output signals from the winding switching instruction unit 12 are uncoupled from the winding configuration retention unit 13 (high impedance state in terms of the ports of the arithmetic processing unit). The motor 3 may be operating at a high rotation speed at the time of occurrence of a reset due to lightning-induced noise or the like. In this case, the winding configuration before the occurrence of the reset is delta connection, and accordingly, when the winding configuration is switched from the delta connection to the star connection in the reset operation or in a process after performing the reset operation, the counterelectromotive force induced by the motor 3 becomes excessive even when the winding switching unit 7 can avoid failure due to surge voltage. Accordingly, the counterelectromotive force may exceed the withstand voltage of the motor drive unit 2 to cause the motor drive unit 2 to fail. The star connection induces a counterelectromotive force in the motor 3, theoretically √3 times higher than that of the case of the delta connection.

Nevertheless, assuming the configuration illustrated in FIG. 2, the two input terminals of the winding configuration retention unit 13 are coupled with the pull-up resistors R100 and R101. Thus, even when a reset occurs in the arithmetic processing unit that implements the control unit 11 including the winding switching instruction unit 12, which then causes a signal input from the winding switching instruction unit 12 to the winding configuration retention unit 13 to be lost, the input signals S and R to the winding configuration retention unit 13 are both at "H". This allows the output signal Q of the winding configuration retention unit 13 to retain the state that has been output until that time. In addition, until a motor drive instruction is received while the motor 3 is in a stop state, and the motor 3 is started to operate, the winding switching instruction unit 12 continues outputting an instruction (S=H, R=H) to hold the winding configuration. In this case, the relationships among the input signals S and R to the winding configuration retention unit 13 and the output signal Q of the winding configuration retention unit 13 are as illustrated in FIG. 10. FIG. 10 is a diagram illustrating the relationships among the input signals to the winding configuration retention unit 13 and the output signal of the winding configuration retention unit 13 upon occurrence of a reset when the windings are in the star connection. This operation can prevent unintentional switching of the winding connection configuration of the motor 3 upon occurrence of a reset in the arithmetic processing unit that implements the control unit 11. Thus, even when the motor 3 is operating at a high rotation speed at the time of occurrence of a reset, such operation can prevent switching of the winding connection configuration of the motor 3 from the delta connection to the star connection, and can thus prevent the counterelectromotive force induced in the motor 3 from becoming too high. Thus, failure of the motor drive unit 2 due to the counterelectromotive force can be prevented.

As described above, the motor drive unit 2 according to the present embodiment includes the winding switching unit 7 that switches the winding connection configuration of the motor 3, the winding switching instruction unit 12 that generates the winding switching instruction with respect to the motor 3, and the winding configuration retention unit 13 that receives the winding switching instruction output from the winding switching instruction unit 12, and when the winding switching instruction received indicates neither of the delta connection and the star connection instruction, outputs, to the winding switching unit 7, a same signal as the signal that has been output before the reception of the winding switching instruction. In a case in which the winding switching instruction unit 12 that generates a winding switching instruction is implemented using an arithmetic processing unit such as a microcomputer, this prevents switching of the winding connection configuration even when an unexpected reset due to lightning-induced noise or the like occurs during operation of the motor 3. According to the present embodiment, the motor drive unit 2 having high reliability can be provided that can prevent failure upon occurrence of a reset in the arithmetic processing unit that implements the winding switching instruction unit 12, and can thus reliably return to operation. Moreover, the motor drive unit 2 does not allow switching of the winding connection configuration during operation of the motor 3, and is thus effective in that a permanent magnet motor advantageous in the efficiency can be used as the motor 3.

In addition, the overcurrent protection level of the overcurrent protection circuit 10 of the motor drive unit 2 is switched based on the output of the winding switching instruction unit 12. This enables the state of the overcurrent protection level to reliably match the winding connection configuration. This can thus ensure overcurrent protection, including demagnetization protection, of the motor 3 and the motor drive unit 2.

Moreover, the winding configuration retention unit 13 is configured using an RS flip-flop to continue outputting a winding switching instruction to the winding switching unit 7 even during operation of the motor 3 except in specific sections, specifically, the section during which the winding connection configuration is switched and the section after reset removal. This can prevent switching of the winding connection configuration upon superimposition of noise in an output signal of the winding switching instruction unit 12.

Furthermore, switching of the winding connection configuration is prevented during operation of the motor 3. This can assure the product warranty period of the air conditioner 1 with sufficient margin even when the winding switching unit 7 is configured using mechanical relays having a certain contact life. The low conduction loss property of mechanical relay allows the loss in the winding switching unit 7 to be minimized.

Note that the motor drive unit 2 according to the present embodiment has been described as being configured to select the star connection during operation of the motor 3 in a low speed rotation range, and to select the delta connection during operation of the motor 3 in a high speed rotation range, but the selection operation is not limited thereto. For example, as disclosed in Japanese Patent Application Laid-open No. 2012-227980, a configuration that allows changing of the number of turns of a stator winding may be used to select a configuration in which the stator winding(s) has or have a higher number of turns during operation in a low speed rotation range, and to select a configuration in which the stator winding(s) has or have a lower number of turns during operation in a high speed rotation range, thus to provide both of high power operation and highly energy-saving operation. Otherwise, as disclosed in Japanese Patent Application Laid-open No. 2000-278992, a configuration that allows selection of a connection configuration from a connection configuration of series coupling of the windings and a connection configuration of parallel coupling of the windings may be used, to select the configuration of series coupling of the windings in a low speed rotation range, and to select the configuration of parallel coupling of the windings in a high speed rotation range, thus to provide both of high power operation and highly energy-saving operation.

In addition, the present embodiment has been described in which the motor drive unit 2 selects, and switches to, one of two connection configurations. However, a configuration having three or more types of selectable connection configurations may be used to allow selection, and switching to, one of these connection configurations. Moreover, a configuration may be used that allows selection of one connection configuration, depending on the rotational speed of the motor 3, from a combination of the switching between a star connection and a delta connection, the changing of the number of turns, and the switching between windings coupled in series and windings coupled in parallel as described above.

Furthermore, the present embodiment has been described in terms of an example in which the winding configuration retention unit 13 is configured using an RS flip-flop, but is not limited to this configuration. Functionality similar to the functionality of the winding configuration retention unit 13 can also be provided using a configuration such as, for example, a delay flip-flop (D flip-flop), or a JK flip-flop.

Second Embodiment

Figure 11:
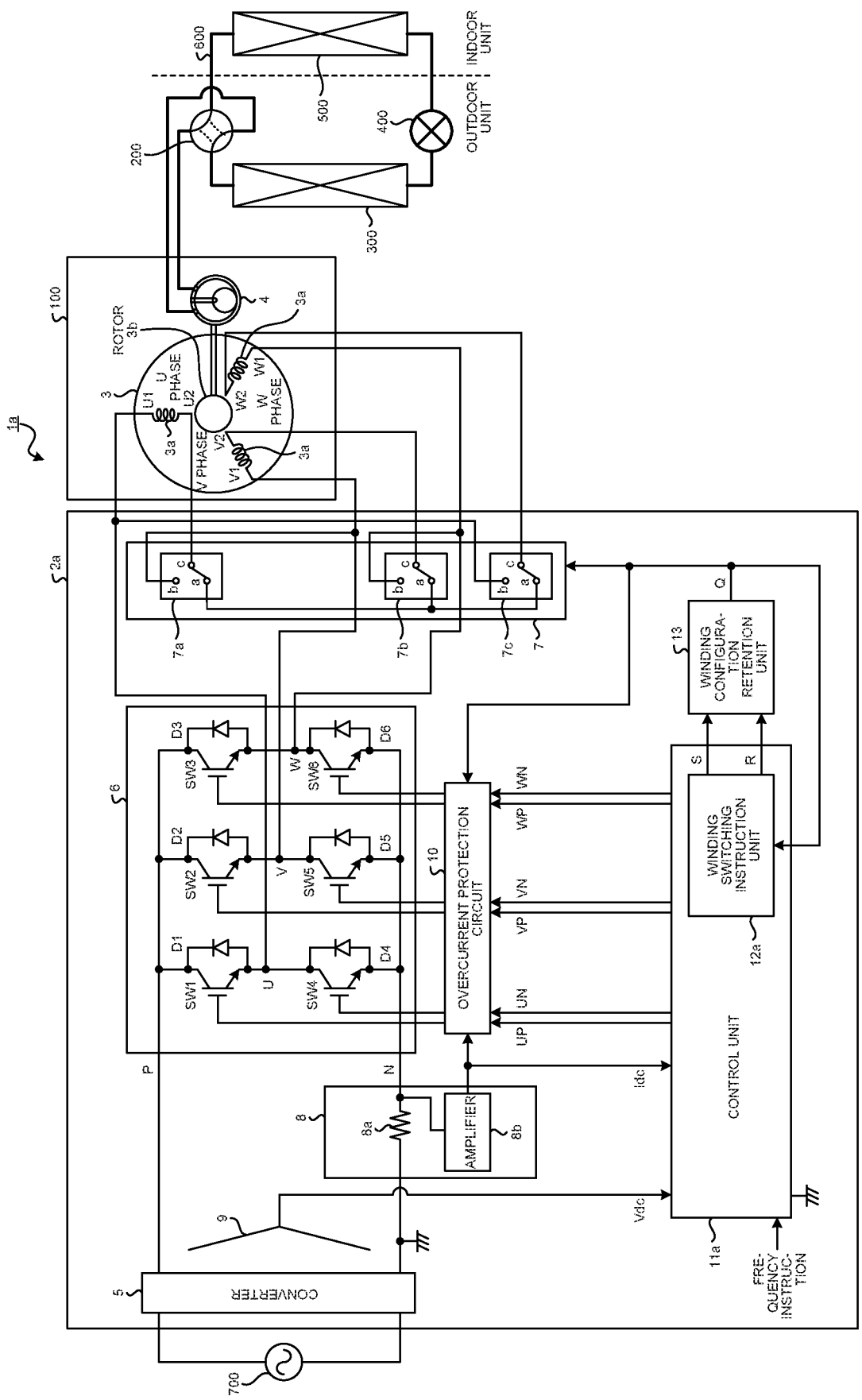
FIG. 11 is a diagram illustrating an example configuration of an air conditioner according to a second embodiment.

FIG. 11 is a diagram illustrating an example configuration of an air conditioner according to a second embodiment. An air conditioner 1a according to the second embodiment includes a motor drive unit 2a in place of the motor drive unit 2 of the air conditioner 1 according to the first embodiment. The motor drive unit 2a includes a control unit 11a including a winding switching instruction unit 12a, in place of the control unit 11 including the winding switching instruction unit 12 in the motor drive unit 2. The motor drive unit 2a is identical to the motor drive unit 2 except the winding switching instruction unit 12a. Thus, the elements other than the winding switching instruction unit 12a are designated by the same reference characters as those of the corresponding elements in the motor drive unit 2, and description thereof will be omitted.

The motor drive unit 2a is configured such that the signal output from the winding configuration retention unit 13, i.e., a same signal as the signal input to the winding switching unit 7, is fed back to the winding switching instruction unit 12a.

An operation of the winding switching instruction unit 12a will now be described with reference to FIG. 12. FIG. 12 is a diagram illustrating relationships among the input signals to the winding configuration retention unit 13 and the output signal of the winding configuration retention unit 13 upon occurrence of a reset when the windings are in the star connection.

As illustrated in FIG. 12, upon occurrence of a reset in the arithmetic processing unit that implements the control unit 11 including the winding switching instruction unit 12a during operation of the motor 3 when the windings are in the star connection, the output signals from the winding switching instruction unit 12a become uncoupled from the winding configuration retention unit 13 (high impedance state in terms of the ports of the arithmetic processing unit) immediately after the reset. This drives the input signals S and R to the winding configuration retention unit 13 to the "H" state by means of the pull-up resistors R100 and R101 (portion (1) in FIG. 12). On the other hand, the output signal Q of the winding configuration retention unit 13 is maintained at the output value immediately before the reset, and thus remains "Q=L" indicating the star connection even immediately after the reset. This output signal Q of the winding configuration retention unit 13 is fed back to the winding switching instruction unit 12a, and the winding switching instruction unit 12a uses, as the initial output value, the winding switching instruction having a value that corresponds to the winding configuration corresponding to the value of the output signal Q that has been fed back. In the case illustrated in FIG. 12, a signal indicating the star connection being fed back causes the winding switching instruction unit 12a to use the combination "S=H and R=L" as the initial output value (portion (2) of FIG. 12).

As described above, the motor drive unit 2a according to the present embodiment is configured to feed back the signal output from the winding configuration retention unit 13 to the winding switching unit 7, to the winding switching instruction unit 12a, and the winding switching instruction unit 12a then uses the initial value of the winding switching instruction after occurrence of the reset as the value corresponding to the value of the fed-back signal. This can prevent occurrence of unexpected switching of winding configuration upon superimposition of noise in the output signal of the winding switching instruction unit 12a during a time period after occurrence of a reset in the arithmetic processing unit that implements the winding switching instruction unit 12a and before the restart of operation of the motor 3.

The configurations described in the foregoing embodiments are merely examples of various aspects of the present invention. These configurations may be combined with a known other technology, and moreover, a part of such configurations may be omitted and/or modified without departing from the spirit of the present invention.

The invention claimed is:

1. An electric motor drive unit comprising:
a winding switching circuit to switch a configuration of windings of an electric motor;
an arithmetic processing unit to generate an instruction signal for the winding switching circuit; and
a winding configuration retention circuit to which the instruction signal generated by the arithmetic processing unit is input, and in a first case in which the input instruction signal has a first value, to output a signal corresponding to the input instruction signal to the winding switching-circuit, and in a second case in which the input instruction signal has a second value different from the first value, to continue outputting a signal that has been output to the winding switching circuit before the reception of the second value, the first value indicating an instruction on the configuration of the windings,
wherein
the instruction signal upon occurrence of a reset in the arithmetic processing unit is caused to have the second value, and
the arithmetic processing unit receives feedback of a signal output from the winding configuration retention circuit to the winding switching circuit, and determines the first value upon changing the instruction signal from the second value to the first value on a basis of the signal that has been fed back.

2. The electric motor drive unit according to claim 1, wherein
the second value indicates maintaining of the configuration of the windings before the occurrence of the reset.

3. The electric motor drive unit according to claim 1, wherein
the first value indicates a connection configuration of the windings.

4. The electric motor drive unit according to claim 3, wherein
the connection configuration indicated by the first value is a delta connection or a star connection.

5. The electric motor drive unit according to claim 3, wherein
the connection configuration indicated by the first value is a configuration of a plurality of windings coupled in series to one another or a configuration of a plurality of windings coupled in parallel to one another.

6. The electric motor drive unit according to claim 1 comprises:
an overcurrent protection circuit to prevent a current greater than a predetermined capacity from flowing in the electric motor drive unit, wherein
an overcurrent protection level, which is a level that causes the overcurrent protection circuit to be actuated, is switched depending on the configuration of the windings.

7. The electric motor drive unit according to claim 1, wherein
the winding configuration retention circuit is configured using a reset-set flip-flop.

8. The electric motor drive unit according to claim 1, wherein
the winding switching circuit is configured using a mechanical relay.

9. The electric motor drive unit according to claim 1, wherein
the electric motor is a permanent magnet electric motor.

10. A compressor comprising:
an electric motor driven by the electric motor drive unit according to claim 1.

11. An air conditioner comprising:
the compressor according to claim 10.

12. An electric motor drive unit comprising:
a winding switching circuit to switch a configuration of windings of an electric motor;
an arithmetic processing unit to generate an instruction signal for the winding switching circuit; and
a winding configuration retention circuit to which the instruction signal generated by the arithmetic processing unit is input, and in a first case in which the input instruction signal has a first value, to output a signal corresponding to the input instruction signal to the winding switching-circuit, and in a second case in which the input instruction signal has a second value different from the first value, to continue outputting a signal that has been output to the winding switching circuit before the reception of the second value, the first value indicating an instruction on the configuration of the windings,
wherein
the instruction signal upon occurrence of a reset in the arithmetic processing unit is caused to have the second value, and
the first value indicates a number of turns of the windings.

13. The electric motor drive unit according to claim 12, wherein
the second value indicates maintaining of the configuration of the windings before the occurrence of the reset.

14. The electric motor drive unit according to claim 12, wherein
the first value indicates a connection configuration of the windings.

15. The electric motor drive unit according to claim 14, wherein
the connection configuration indicated by the first value is a delta connection or a star connection.

16. The electric motor drive unit according to claim 14, wherein
the connection configuration indicated by the first value is a configuration of a plurality of windings coupled in series to one another or a configuration of a plurality of windings coupled in parallel to one another.

17. The electric motor drive unit according to claim 12 comprises:
an overcurrent protection circuit to prevent a current greater than a predetermined capacity from flowing in the electric motor drive unit, wherein
an overcurrent protection level, which is a level that causes the overcurrent protection circuit to be actuated, is switched depending on the configuration of the windings.

18. The electric motor drive unit according to claim 12, wherein
the winding configuration retention circuit is configured using a reset-set flip-flop.

19. The electric motor drive unit according to claim 12, wherein
the winding switching circuit is configured using a mechanical relay.

20. The electric motor drive unit according to claim 12, wherein the electric motor is a permanent magnet electric motor.

21. A compressor comprising:

an electric motor driven by the electric motor drive unit according to claim 12.

22. An air conditioner comprising:

the compressor according to claim 21.

* * * * *